UNITED STATES PATENT OFFICE.

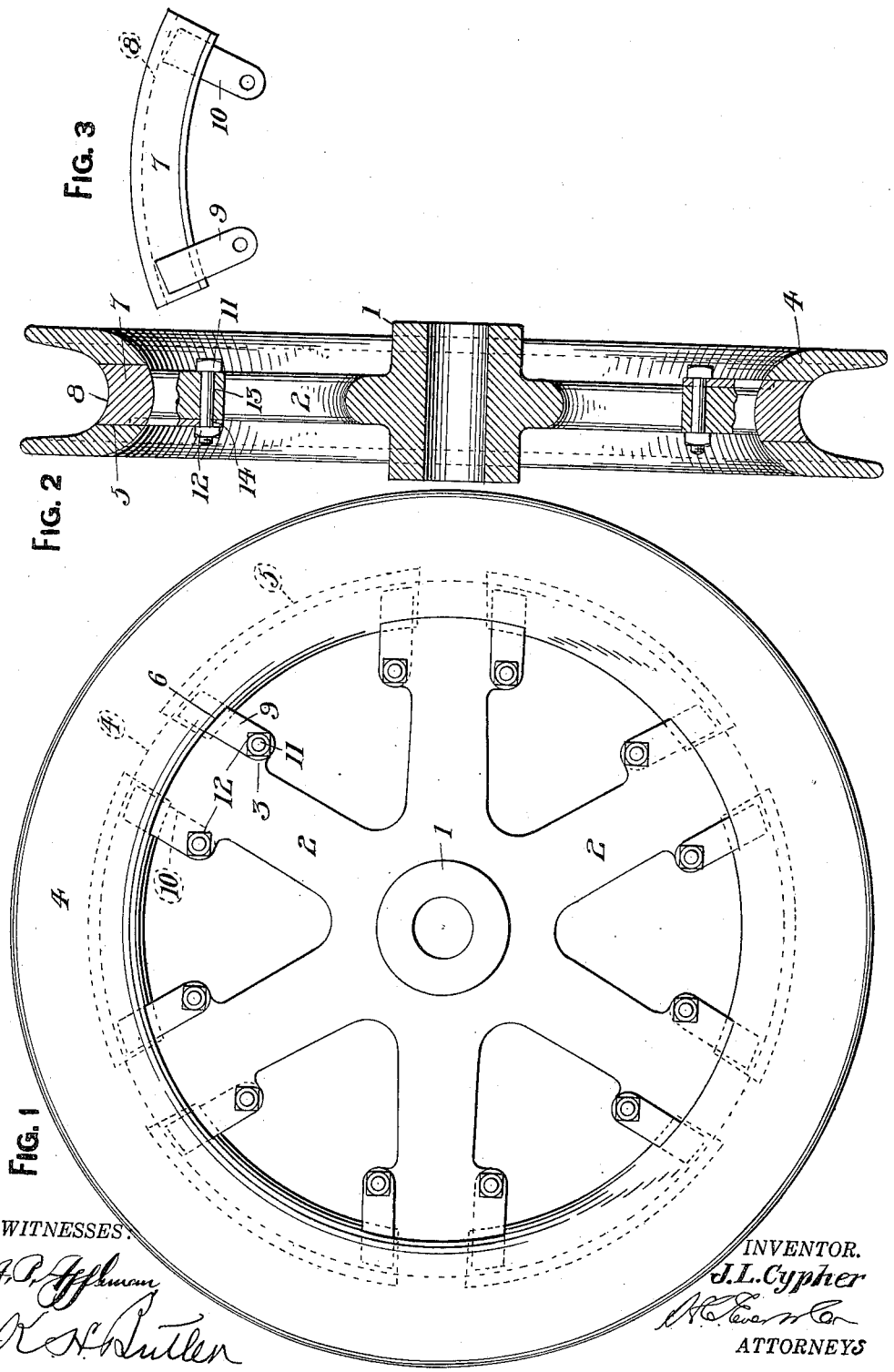

JAMES L. CYPHER, OF CONNELLSVILLE, PENNSYLVANIA.

SHEAVE.

1,036,459.

Specification of Letters Patent. Patented Aug. 20, 1912.

Application filed July 15, 1911. Serial No. 638,629.

*To all whom it may concern:*

Be it known that I, JAMES L. CYPHER, a citizen of the United States of America, residing at Connellsville, in the county of Fayette and State of Pennsylvania, have invented certain new and useful Improvements in Sheaves, of which the following is a specification, reference being had therein to the accompanying drawing.

This invention relates to sheaves, and more particularly to that type used in mines and in connection with cable-ways.

My invention aims to provide a sheave with detachable tread pieces that can be removed and renewed when worn. Sheaves of the above type are subjected to considerable wear and tear that eventually cuts through the rim of the sheave necessitating the entire replacing of the sheave by a new sheave which is subjected to the same wear and tear. It is in this connection that my invention increases the longevity of the sheave by providing tread pieces that can be made of a more indurate material than the body of the sheave. Furthermore, the tread pieces, even when worn, can be easily and quickly removed and renewed without impairing the usefulness of the sheave. To this end I provide the rim of a sheave with a plurality of equally spaced openings in which tread pieces are arranged, these tread pieces receiving the wear and tear of the cable that passes over the same. The tread pieces are secured in a manner whereby they cannot become accidentally displaced, and a sufficient number of pieces are employed to prevent the body of a sheave from being worn or injured.

The invention will be hereinafter specifically described and then claimed, and reference will now be had to the drawing, wherein there is illustrated the preferred embodiments of the invention, but it is to be understood that the structural elements are susceptible to such variations as fall within the scope of the appended claim.

In the drawing:—Figure 1 is a side elevation of the sheave in accordance with this invention; Fig. 2 is a vertical sectional view of the same, and Fig. 3 is a side elevation of a detached tread piece.

A sheave in accordance with this invention comprises a hub 1, having radially-disposed spokes 2, with the outer ends thereof provided with lateral extensions or enlargements 3, and with a rim 4 that is channel-shaped or U-shaped in cross section to receive a cable (not shown). The rim 4 between the spokes 2 is provided with oblong or segment-shaped openings 5, extending from one spoke to the other with the ends of said openings terminating in the lateral extensions 3 of the spokes. The openings 5 are of a greater width than the spokes, and the latter extensions thereof, thereby providing slots 6 at the ends of the lateral extensions and upon both sides thereof.

Arranged in the openings 5 are segment-shaped tread pieces 7, provided with longitudinal grooves 8 extending from one end thereof to the opposite end, said grooves completing the groove of the rim just as though the rim was solid. Each tread piece has the ends thereof provided with arms 9 and 10, preferably made of wrought iron formed integral or cast with the tread piece, the arm 9 being arranged upon the opposite side from the arm 10, and at the opposite end of said tread from that of the arm 10. The arms 9 and 10 are adapted to extend through the slot 6 and be secured to opposite sides of the lateral extensions 3 of the spokes 2. The arms 9 and 10 are therefore disposed at an angle relatively to the tread pieces, such angularity of the same placing them in a plane in parallelism with the spokes 2. As a fastening means for the arms, bolts 11 and nuts 12 can be employed, said bolts extending through openings 13 and 14 provided therefor in the spokes 2 of the arms 9 and 10 respectively.

The invention is not limited to the number of tread pieces employed, or to their specific arrangement.

What I claim is:—

A sheave comprising spokes having the outer ends thereof formed with lateral extensions, a grooved rim integral with said spokes and provided with segment-shaped openings, each of said openings extending from a point inwardly of the plane of the edge of one spoke to a point inwardly of the plane of the edge of an opposing spoke, the width of said openings with respect to said spokes being such as to provide slots upon both sides of the lateral extensions, segment-shaped tread pieces arranged in said openings and having their ends seated against said spokes and provided with oppositely-disposed arms extending through said slots and arranged against said lateral extensions, and hold-fast devices for coupling the arms of the lateral extensions together, the outer faces of said tread pieces flush with the wall of the groove of the rim.

In testimony whereof I affix my signature in the presence of two witnesses.

JAMES L. CYPHER.

Witnesses:
J. H. SWEENEY,
BOYD RHODES.

Copies of this patent may be obtained for five cents each, by addressing the "Commissioner of Patents, Washington, D. C."